United States Patent [19]
Hirano et al.

[11] Patent Number: 5,790,106
[45] Date of Patent: Aug. 4, 1998

[54] COORDINATE INPUT APPARATUS WITH PEN AND FINGER INPUT DETECTION

[75] Inventors: Shinji Hirano; Mikio Matsumoto; Shinichi Higuchi; Kinya Inoue; Yoshihisa Endo; Tadashi Manome, all of Fukushima-ken, Japan

[73] Assignee: Alps Electric Co., Ltd., Japan

[21] Appl. No.: 557,507

[22] Filed: Nov. 14, 1995

[30] Foreign Application Priority Data

Nov. 15, 1994 [JP] Japan ................................... 6-280613
Nov. 16, 1994 [JP] Japan ................................... 6-282033

[51] Int. Cl.$^6$ ........................... G09G 3/02; G08C 21/00
[52] U.S. Cl. .................. 345/173; 345/174; 345/179; 178/18; 178/19
[58] Field of Search ......................... 178/18, 19, 20; 345/173, 174, 179; 341/33

[56] References Cited

U.S. PATENT DOCUMENTS

| | | | |
|---|---|---|---|
| 4,550,310 | 10/1985 | Yamaguchi et al. | 344/33 |
| 4,723,056 | 2/1988 | Tamasu et al. | 178/19 |
| 4,806,709 | 2/1989 | Evans | 178/19 |
| 5,149,918 | 9/1992 | Kozik et al. | 178/18 |
| 5,557,076 | 9/1996 | Wieczorek et al | 178/19 |

FOREIGN PATENT DOCUMENTS 61-82225  4/1986  Japan .

*Primary Examiner*—Steven J. Saras
*Assistant Examiner*—Vijay Shankar
*Attorney, Agent, or Firm*—Brinks Hofer Gilson & Lione

[57] ABSTRACT

A coordinate input apparatus which performs an input operation with high precision by use of either an operator's finger or an input pen. The input apparatus includes a tablet having a plurality of X electrodes and Y electrodes arranged in the form of a matrix on the respective top and bottom surfaces of a glass substrate. The input apparatus also has a first oscillation circuit connected to the X electrodes through an analog switch. It is further provided with an input pen containing a second oscillation circuit. When the pen is used to perform the input operation through use of coordinates, the following method of determining the coordinates designated by the pen is employed. A voltage oscillating from the pen is applied to each electrode through capacitance, and the resulting output voltage varies depending on the distance from each electrode to the pen. Based on the varied output voltages, a predetermined computation process is executed to determine the coordinates designated by the pen. On the other hand, when the operator's finger is used to perform the input operation, the analog switch is switched to the first oscillation circuit. Then, a voltage at a predetermined frequency is sequentially applied to each of the X electrodes from the first oscillation circuit, and the voltage applied across the X and Y electrodes is changed due to a decrease in the capacitance therebetween caused by the touching of the finger. Based on this change, coordinates designated by the finger is detected.

8 Claims, 8 Drawing Sheets

COORDINATE INPUT APPARATUS WITH PEN AND FINGER INPUT DETECTION

BACKGROUND OF THE INVENTION

1. Field of the Invention

The present invention relates to a capacitive coordinate input apparatus and, more particularly, to a coordinate input apparatus which performs the input operation through use of coordinates either with an input pen or an operator's finger.

2. Description of the Related Art

A coordinate input apparatus of the following type has been suggested. A transparent tablet is located on the front surface of a display screen, such as a liquid crystal display (LCD), a cathode ray tube (CRT), or the like. Information, such as characters, graphics, and the like, is hand-recorded by moving an input pen on the tablet. Also, menus on the display screen are selected upon the touching of an operator's finger on the tablet.

FIG. 11 is a schematic view of an example of the coordinate input apparatus of this type. A tablet designated by T is formed by depositing a transparent resistive film, formed of Indium Tin Oxide (ITO) or the like, on the overall surface of a transparent base material.

A constant alternate current is applied to electrodes placed at four corners of the tablet T. Under these conditions, it will now be assumed that the operator's finger touches a desired position on the surface of the tablet T. Then, based on a change in impedance caused by the touching of the finger, a current flows into the finger from each of the electrodes through the resistive film. The detected current drawn from each of the electrodes varies depending on the distance from the finger to each of the four corners of the tablet T. Thus, the coordinates (X, Y) of the point designated by the finger can be determined by the following equations when the two lines interconnecting the opposing two pairs of electrodes are indicated by X and Y axes, respectively:

$$X = i_1/(i_1+i_3)$$

$$Y = i_2/(i_2+i_4)$$

In contrast to the input operation performed by the operator's finger, it will now be assumed that the operator holds the input pen connected to the main unit via a cable and brings the conductive pen tip attached to the forward end of the pen into contact with a desired position on the surface of the tablet T. Then, a current flows into the main unit from each of the electrodes through the resistive film and the input pen. The detected current drawn from each of the electrodes varies depending on the distance from the input pen to each of the four corners of the tablet T. Similarly, the coordinates (X, Y) of the point designated by the pen can thus be obtained based on the detected current drawn from each of the electrodes.

However, the coordinate input apparatus of the above-described conventional type encounters the following problems. Any extraneous matter, such as dirt, moisture and fat content, and the like, adhering to the tip of the input pen or the finger, or to the surface of the resistive film of the tablet T, makes it difficult to detect the coordinates of the point designated by the pen or the finger with high precision, or even makes it totally impossible to perform the detection of the coordinates. Further, the necessity of connecting the input pen to the main unit via a cable lowers the ease of operation during use of the pen, which further reduces the S/N ratio caused by extraneous noise.

SUMMARY OF THE INVENTION

Accordingly, in view of the above-described problems inherent in the prior art, it is an object of the present invention to provide a coordinate input apparatus which performs the input operation through use of coordinates with high precision either with an operator's finger or an input pen.

Another object of the present invention is to provide a coordinate input apparatus which can be simply constructed and can achieve higher precision of positional detection.

In order to achieve the above objects, the present invention provides a coordinate input apparatus comprising: a tablet being formed by stacking a plurality of X electrodes and Y electrodes arranged at an equal pitch in the form of a matrix through an insulating layer; first coordinate detection means for detecting a position on the tablet designated by an input pen; second coordinate detection means for detecting the position on the tablet designated by a finger; and change-over means for selecting one of the first and second coordinate detection means, wherein the first coordinate detection means has pulse generating means contained in the input pen for oscillating a voltage at a predetermined frequency, voltage detection means for detecting a voltage applied to each of the electrodes from the input pen, and computation means for computing coordinates of the position designated by the input pen based on the voltage detected by the voltage detection means, wherein the second coordinate detection means has pulse generating means for sequentially applying a voltage at a predetermined frequency to one of the X and Y electrodes, voltage detection means for detecting a change in the voltage across the X and Y electrodes caused by the touching of the finger, and computation means for computing coordinates of the position designated by the finger based on the voltage detected by the voltage detection means.

In the coordinate input apparatus constructed as described above, the change-over means may compare the voltage that is output from each of the electrodes with a reference voltage, and upon this comparison, selects the first coordinate detection means when the output voltage is increased relative to the reference voltage and selects the second coordinate detection means when the output voltage is decreased relative to the reference voltage.

Also, in the coordinate input apparatus, the change-over means may include switching means that is driven in a time sharing manner and switched every predetermined time so as to select between the first and second coordinate detection means in accordance with a switching operation of the switching means.

Further, the present invention provides a coordinate input apparatus comprising: a tablet being formed by stacking a plurality of X electrodes and Y electrodes arranged at an equal pitch P in the form of a matrix through an insulating layer; an input pen oscillating a voltage at a predetermined frequency; voltage detection means for detecting a voltage applied to each of the electrodes based on a change in capacitance across the input pen and each of the electrodes; and computation means for computing the amount of displacement L from the input pen to the electrode located in proximity nearest to the pen in the direction in which the electrodes are arranged, according to the following equation:

$$L = P(V_1V_2 - V_1V_3)/2(V_1V_3 + V_1V_2 - 2V_2V_3)$$

wherein $V_1$ indicates the voltage that is output from the electrode having the largest applying voltage; $V_2$ and $V_3$ represent the voltages that are output from both the electrodes adjacent to the electrode that outputs the largest voltage $V_1$.

When the input pen is used to perform the input operation through use of coordinates, the first coordinate detection means is selected by the change-over means, and the input pen is pressed against a desired position on the tablet. Then, a voltage oscillating from the pen is applied through capacitance to each of the electrodes arranged in the form of a matrix on the tablet. Since the applying voltage is changed depending on the capacitance (distance) between the input pen and each of the electrodes, the output voltage from each of the electrodes also varies depending on the distance from the pen to each of the electrodes, the largest voltage being output from the electrode located nearest to the pen. The resulting output voltages are computed according to a desired computation process. For example, the amount of displacement L from the input pen to the electrode located nearest to the pen in the direction in which the electrodes are arranged is determined according to the following equation:

$$L = P(V_1V_2 - V_1V_3)/2(V_1V_3 + V_1V_2 - 2V_2V_3)$$

wherein P indicates the pitch between the electrodes; $V_1$ denotes the voltage that is output from the electrode having the largest applying voltage; and $V_2$ and $V_3$ represent the voltages that are output from both the electrodes adjacent to the electrode generating the largest voltage $V_1$ ($V_2 > V_3$). This amount of displacement L is added to the coordinates of the electrode placed nearest to the input pen, whereby the coordinates of the point designated by the pen can be detected.

In contrast, when the operator's finger is used to perform the input operation through use of coordinates, the second coordinate detection means is selected by the change-over means, and the finger is brought into contact with a desired position on the tablet. Then, a voltage at a predetermined frequency is sequentially applied through capacitance across the X and Y electrodes to one of the X and Y electrodes on the tablet from the pulse generating means. This capacitance decreases upon the touching of the finger, whereby the coordinates of the point designated by the finger can be detected from the smallest voltage.

DESCRIPTION OF THE PREFERRED EMBODIMENT

An embodiment of the present invention will now be described with reference to the drawings.

Figure 1:
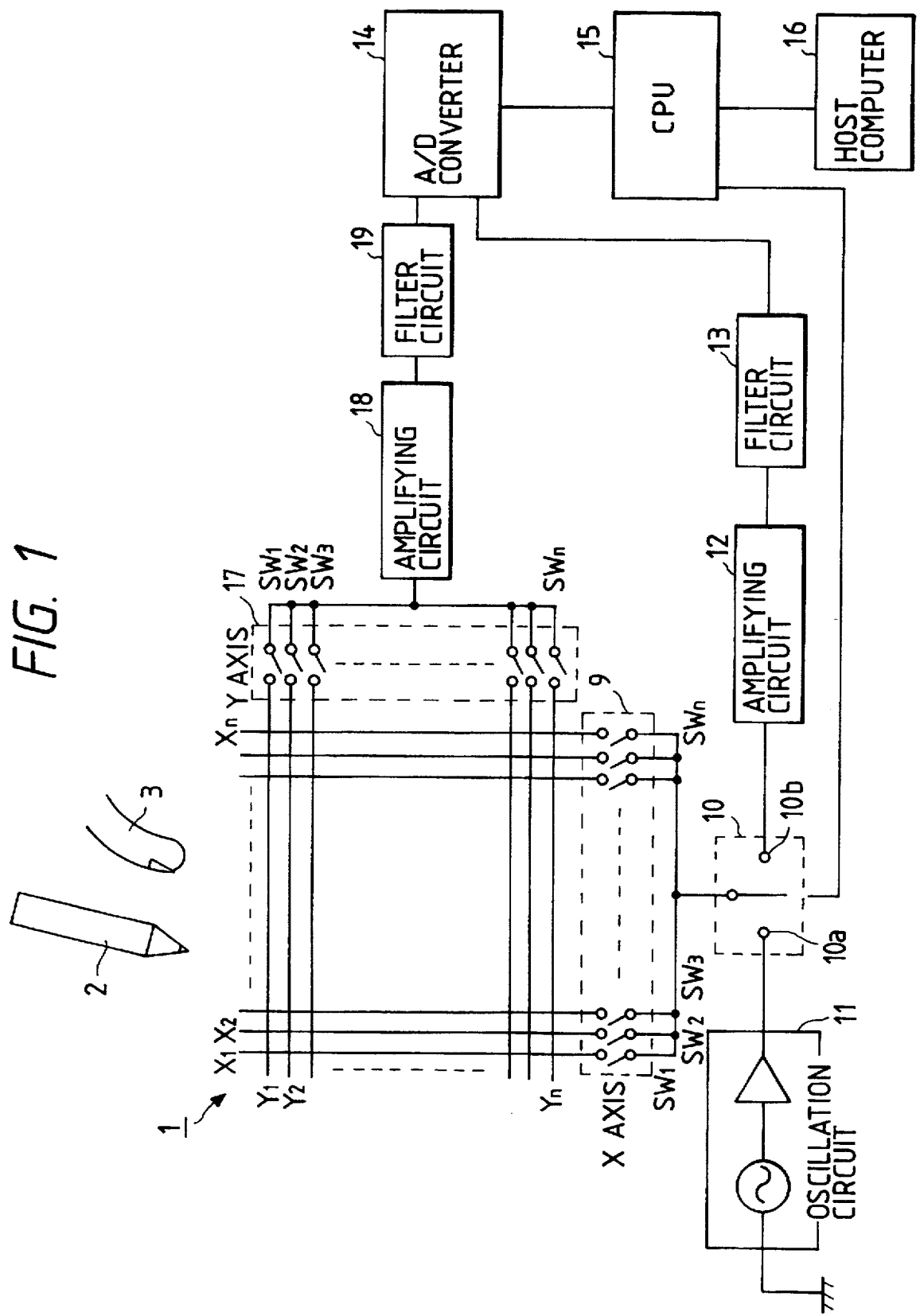
FIG. 1 is a block diagram illustrating the schematic construction of a coordinate input apparatus according to an embodiment of the present invention.
Figure 2:
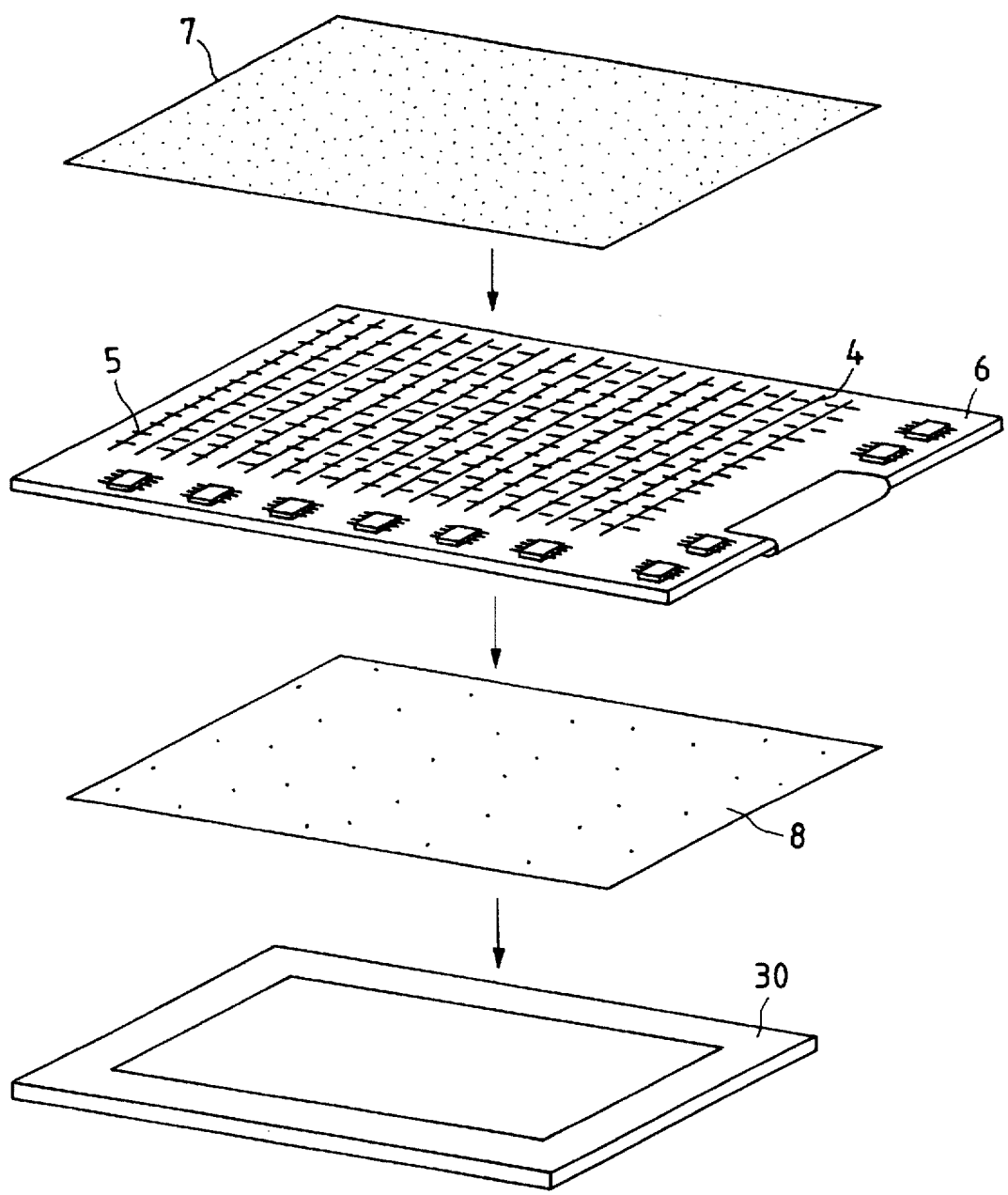
FIG. 2 is an exploded perspective view of a tablet provided for the coordinate input apparatus shown in FIG. 1.
Figure 3:
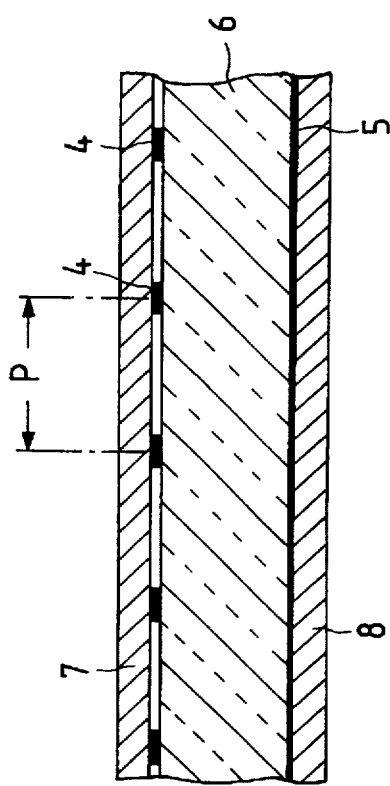
FIG. 3 is a sectional view of the tablet shown in FIG. 2.
Figure 4:
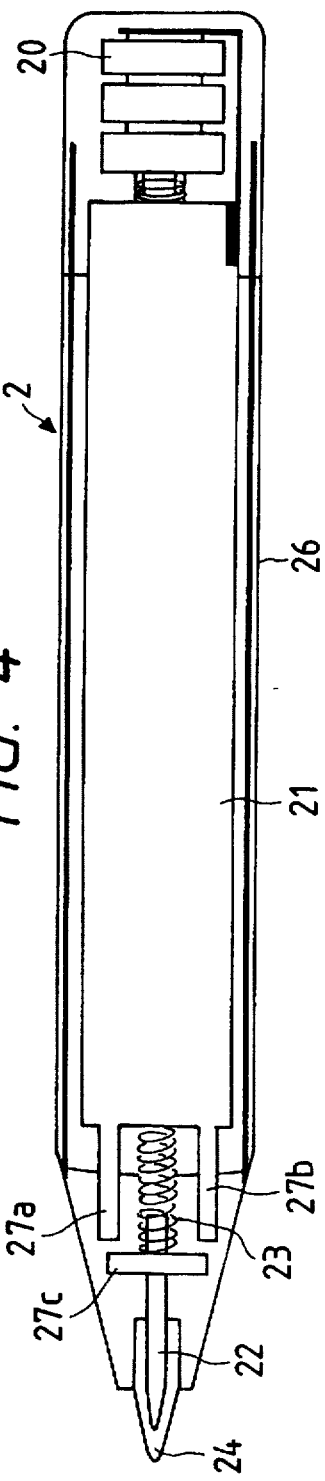
FIG. 4 is a schematic view of an input pen used for the coordinate input apparatus shown in FIG. 1.
Figure 5:
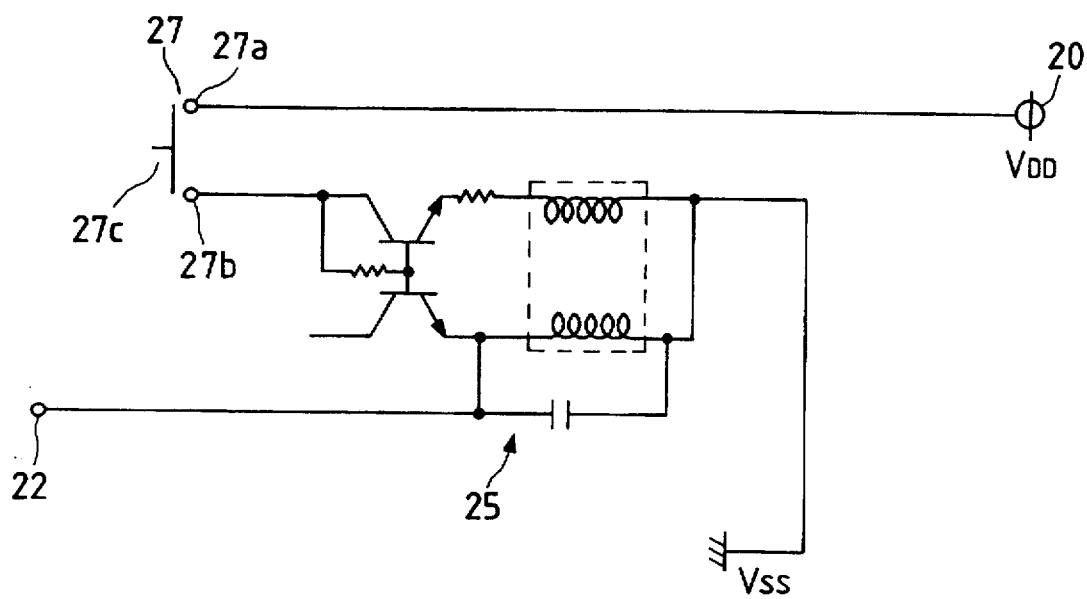
FIG. 5 is a circuit diagram of the input pen shown in FIG. 4.

FIG. 1 is a block diagram illustrating the schematic construction of a coordinate input apparatus according to an embodiment of the present invention. FIG. 2 is an exploded perspective view illustrating a tablet provided for the coordinate input apparatus shown in FIG. 1. FIG. 3 is a sectional view of the tablet shown in FIG. 2. FIG. 4 is a schematic view illustrating an input pen used for the coordinate input apparatus shown in FIG. 1. FIG. 5 is a circuit diagram of the input pen shown in FIG. 4.

FIG. 1 shows a tablet generally denoted by 1, an input pen 2 and the operator's finger 3. The tablet 1 is placed on the front surface of a liquid crystal display (LCD) 30 and a CRT screen (not shown), and can be used to perform the input operation through use of coordinates either with the input pen 2 or the operator's finger 3. As shown in FIGS. 2 and 3, the tablet 1 is formed by stacking the following three elements: a transparent glass substrate 6 having several X electrodes 4 ($X_1, X_2, \ldots, X_n$) and several Y electrodes 5 ($Y_1, Y_2, \ldots, Y_n$) formed of Indium Tin Oxide (ITO) or the like, crossing with each other; a transparent protective film 7 deposited on the top surface of the glass substrate 6; and a transparent shield film 8 deposited on the bottom surface of the glass film 6. The protective film 7 functions as protecting the X electrodes 4 and also as improving the sense of hand-recording with the pen 2 thereon. The shield film 8 serves to interrupt the entry of noise to the liquid crystal display 30. The X electrodes 4 and the Y electrodes 5 are each formed of a transparent conductive material, such as ITO or the like. The X electrodes 4 are arranged on the top surface of the glass substrate 6 at an equal pitch P, while the Y electrodes 5 are disposed on the bottom surface of the glass substrate 6, also at an equal pitch P, the X and Y electrodes 4 and 5 being disposed in the form of a matrix across the glass substrate 6.

Referring again to FIG. 1, an X-coordinate multiplexor 9 is connected to one end of each of the X electrodes 4. An analog switch 10 is connected to the X-coordinate multiplexor 9. The analog switch 10 has first and second contacts 10a and 10b. An oscillation circuit 11 is connected to the first contact 10a, while an analog to digital (A/D) converter 14 is connected to the second contact 10b via an amplifying circuit 12 and a filter circuit 13. The A/D converter 14 is further connected to a CPU 15. This CPU 15 contains the following built-in means: voltage detection means for determining the electrode located in the proximity nearest to the point designated by the input pen 2 or the operator's finger 3, based on the data output from the A/D converter 14; computation means for computing the amount of displacement from the input pen 2 to the nearest electrode according to the equations, which will be explained in more detail; and switching means for switching the analog switch 10 between the first and second contacts 10a and 10b. The coordinates of a point designated by the input pen 2 or the operator's finger 3 which have been computed by the CPU 15 are output to a host computer 16.

On the other hand, a Y-coordinate multiplexor 17 is connected to one end of each of the Y electrodes 15, and the A/D converter 14 is connected to the Y-coordinate multiplexor 17 via an amplifying circuit 18 and a filter circuit 19. The circuit components are mounted on the periphery of the glass substrate 6 out of the way of the X and Y electrodes 4 and 5, and are connected to the host computer 16 via a cable (not shown).

As illustrated in FIG. 4, the input pen 2 is formed in a tubular shape suitable for being manipulated with the operator's hand, and contains button batteries 20 and a printed board 21. Also, at the forward end of the input pen 2, a conductive pen tip 22 is held by a spring 23 so that it can pop in and out of the pen 2. An insulating cap 24 covers the periphery of the pen tip 22. Mounted on the printed board 21 are circuit components for forming an oscillation circuit 25 shown in FIG. 5. A metallic shield member 26 covers the periphery of the printed board 21. The oscillation circuit 25 is simply constructed by a coil, a low power transistor, or the like, and is driven by the button batteries 20. A switch 27 intervenes between the oscillation circuit 25 and the button batteries 20. Both fixed contacts 27a and 27b of the switch 27 are fixed to the printed board 21, while a movable contact 27c is secured to the pen tip 22. When the input pen 2 is not in use, the pen tip 22 is urged by the spring 23 so as to allow the movable contact 27c to separate from the fixed contacts 27a and 27b, thus turning off the switch 27 and rendering the oscillation circuit 25 inoperable. In contrast, when the pen 2 is pressed against the tablet 1 during use, the pen tip 22 resists the spring 23 and slightly recedes backward so as to bring the movable contact 27c into contact with the fixed contacts 27a and 27b. This turns on the switch 27 and renders the oscillation circuit 25 operable, whereby a voltage at a predetermined frequency is output from the forward end of the pen tip 22.

The operation of the coordinate input apparatus constructed as described above will now be explained. An explanation will first be given when the input pen 2 is used to perform the input operation through use of coordinates.

The operator holds the input pen 2 with a hand, and presses the pen tip 22 of the pen 2 against a desired position on the tablet 1 directly or across a sheet (not shown). This operation actuates the oscillation circuit 25 contained in the input pen 2 so as to output a voltage at a predetermined frequency from the forward end of the pen tip 22.

Figure 6:
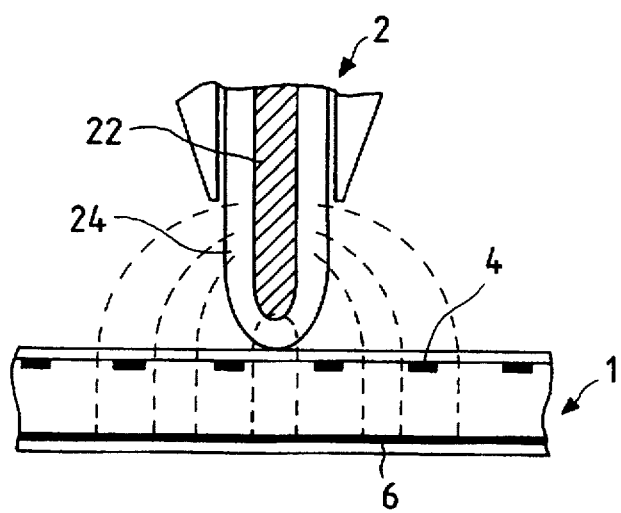
FIG. 6 illustrates the operation performed by the input apparatus for detecting the position of the input pen.

Meanwhile, the analog switch 10 mounted on the tablet 1 has been switched to the second contact 10b according to a signal from switching means contained in the CPU 15 (this switching operation will later be described in detail). In this state, the CPU 15 actuates the X-coordinate multiplexor 9 to cause it to sequentially turn on switches $SW_1$ to $SW_n$. Then, as shown in FIG. 6, a voltage oscillating from the pen 2 is applied to the respective X electrodes 4 ($X_1, X_2, \ldots, X_n$) through capacitance. Since the applying voltage from the pen 2 is changed according to the capacitance between the pen tip 22 and each X electrode 4, i.e., the distance between the pen tip 22 and each X electrode 4, the output voltage also varies according to the distance from each X electrode 4 to the pen tip 22. After the voltage drawn from each X electrode 4 is amplified in the amplifying circuit 12, it has its noise components removed and is also converted into a DC signal in the filter circuit 13. The DC signal is then digitized in the A/D converter 14, and the digitized data is then read into the CPU 15.

The voltage detection means contained in the CPU 15 determines the X electrode 4 which is located in proximity nearest to the input pen 2, based on the data output from the A/D converter 14, and also transmits to the computation means the three voltages applied to the nearest X electrode 4 and to both the adjacent X electrodes 4. The computation means, based on the three output voltages, then computes the amount of displacement from the pen 2 to the nearest X electrode 4.

Figure 7:
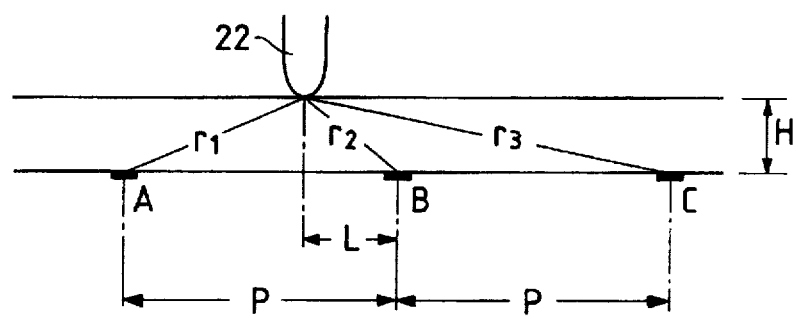
FIG. 7 illustrates the positional relationship between the input pen and three electrodes.
Figure 8:
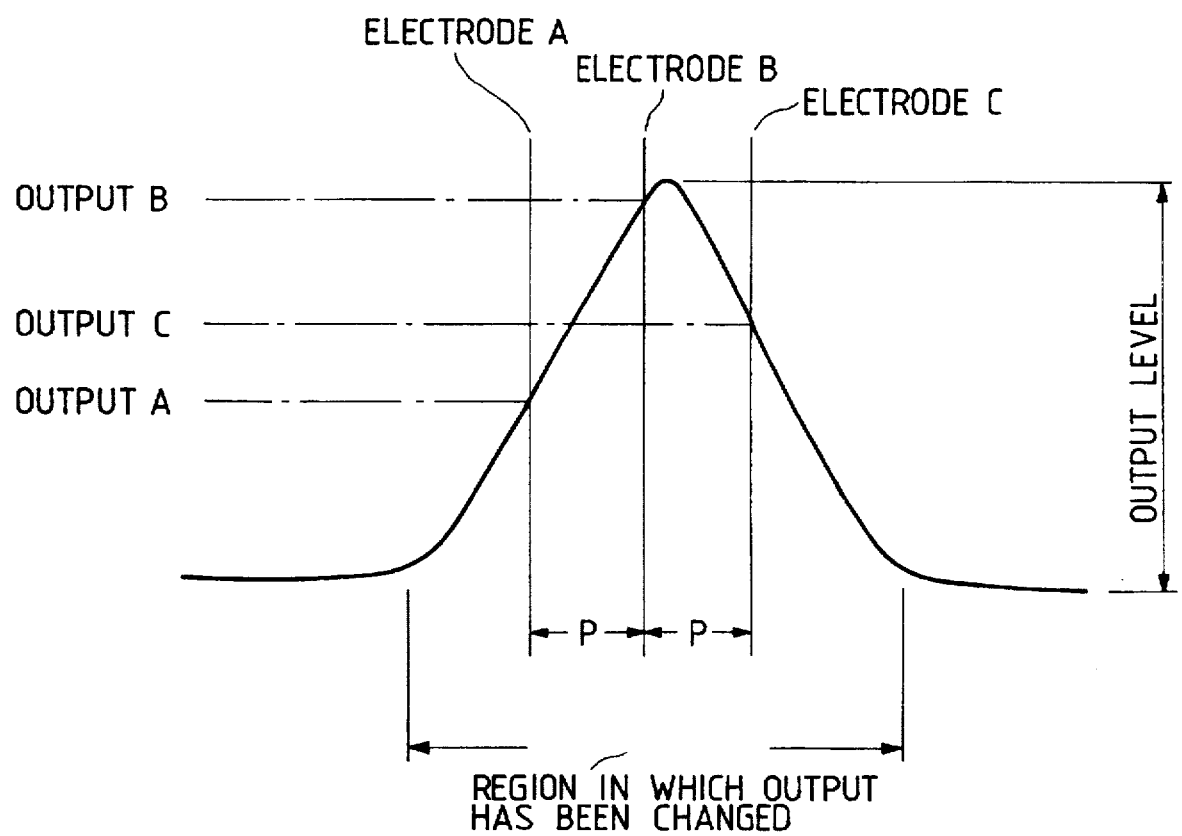
FIG. 8 is a diagram illustrating the positional relationship between the three electrodes and the output voltages therefrom.

More specifically, when the tip 22 of the input pen 2 is located in relation to the continuous three X electrodes 4 (hereinafter referred to as electrode A, electrode B and electrode C) as indicated in the positional relationship shown in FIG. 7, the outputs from the electrodes A, B and C can be represented by the largest voltage $V_1$ from the electrode B, the smaller voltage $V_2$ from the electrode A, and the smallest voltage $V_3$ from the electrode C, as illustrated in FIG. 8. The following theoretical voltages drawn from the respective electrodes A, B and C are defined, based on the theory that these voltages are inversely proportional to the square of the distances from the respective electrodes to the pen tip 22:

$$\text{Voltage from electrode } A = V_2 = K/r_1^2 = K/[H^2 + (P-L)^2] \quad (1)$$

$$\text{Voltage from electrode } B = V_1 = K/r_2^2 = K/[H^2 + L^2] \quad (2)$$

$$\text{Voltage from electrode } C = V_3 = K/r_3^2 = K/[H^2 + (P+L)^2] \quad (3)$$

wherein $r_1$ indicates the distance from the electrode A to the pen tip 22; $r_2$ represents the distance from the electrode B to the pen tip 22; $r_3$ designates the distance from the electrode C to the pen tip 22; H indicates the distance of the normal from the pen tip 22 to the electrode-forming surface; L denotes the amount of displacement from the electrode B mounted on the electrode forming-surface to the pen tip 22; P represents the pitch between the X electrodes 4; and K designates the constant.

The above simultaneous equations (1) to (3) are solved to obtain the amount of displacement L of the pen tip 22 as follows:

$$L = P(V_1V_2 - V_1V_3)/2(V_1V_3 + V_1V_2 - 2V_2V_3) \quad (4)$$

The equation (4) shows that the amount of displacement L of the pen tip 22 can be determined only by the known pitch P and the voltages $V_1$, $V_2$ and $V_3$ output from the respective electrodes A, B and C, without considering the normal H, no matter how the input operation is performed, i.e., whether the input is manually performed by directly pressing the pen 2 on the protective film 7 of the tablet 1 or by pressing the pen 2 on a sheet, such as drawing paper or the like, placed on the tablet 1.

Figure 10:
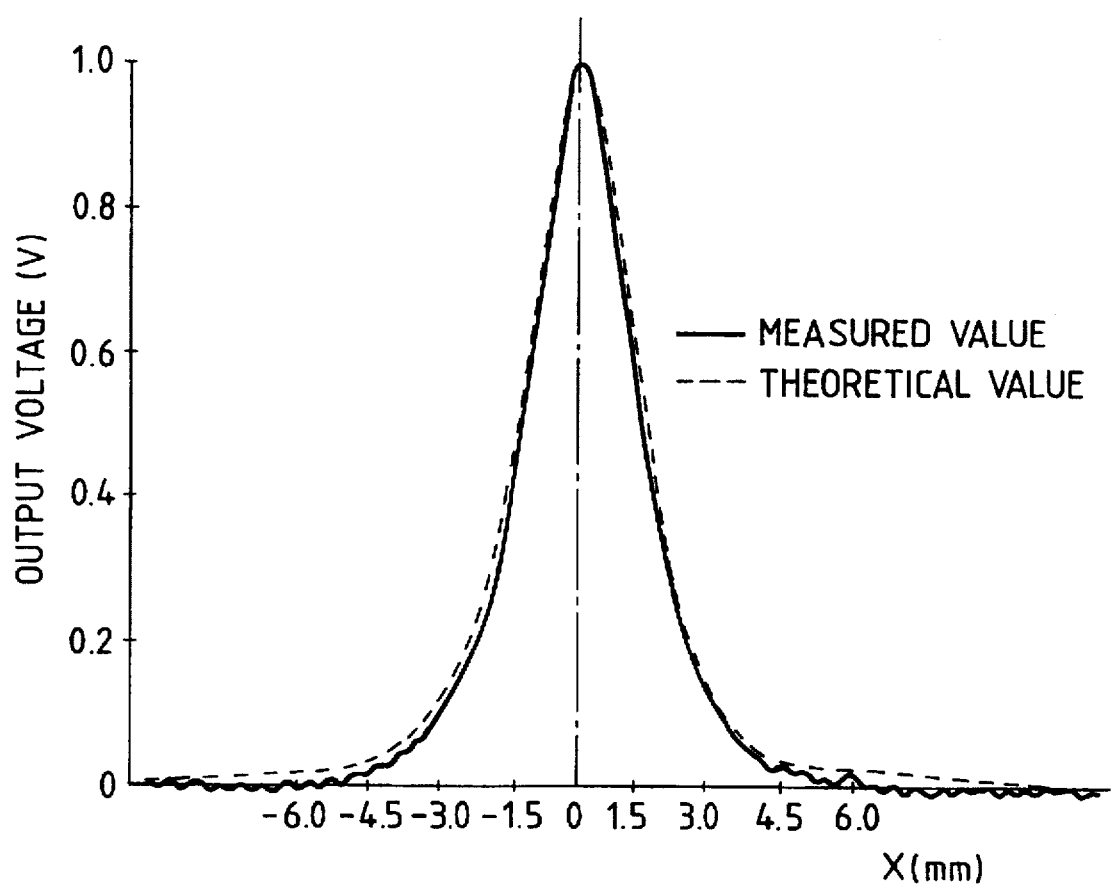
FIG. 10 is a diagram for comparing the theoretical values and the actually measured values of the output voltages.
Figure 11:
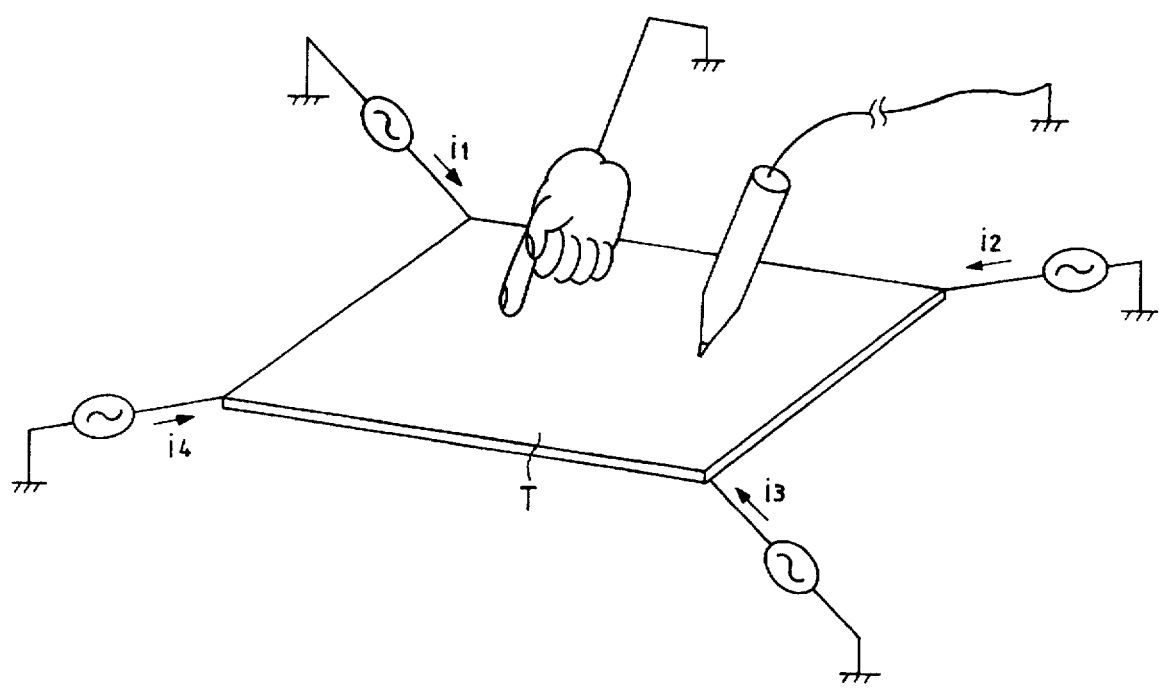
FIG. 11 is a schematic view of a conventional coordinate input apparatus.

In comparison of the theoretical value defined according to the equation (4) with the actually measured value, the two values substantially coincide with each other, as indicated by the curves in FIG. 10. In FIG. 10, the vertical axis represents the output voltage, while the horizontal axis indicates the distance X from the point 0 on the tablet 1 designated by the input pen 2. FIG. 10 clearly shows that the amount of displacement L of the pen 2 can be correctly detected according to the equation (4). Also, the computation of the equation (4), which is a linear function, is very simple, thus reducing the burden on the CPU 15.

The detection of the coordinate in the Y-axis direction of a point designated by the input pen 2 can be performed in a manner similar to the detection in the X-axis direction. In this case, the CPU 15 operates the Y-coordinate multiplexor 17 and causes it to sequentially turn on the switches $SW_1$ to $SW_n$. Then, as shown in FIG. 6, the voltages are applied to the respective Y electrodes 5 ($Y_1, Y_2, \ldots, Y_n$) according to the distance between the pen tip 22 and each of the Y electrodes 5. After being amplified in the amplifying circuit 18, the voltages pass through the filter circuit 19 and are digitized in the A/D converter 14. The digitized data is then read into the CPU 15. The CPU 15 determines the Y electrode 5 located in proximity nearest to the input pen 2 and also detects the coordinate in the Y-axis direction designated by the input pen 2 by calculating the equation similar to the equation (4). After determining the coordinates in the X and Y-axes directions of the point designated by the pen 2 in the manner discussed above, the CPU 15 transmits this positional information to the host computer 16, and allows it to be displayed in the form of a diagram or the like, representing the motion of the pen 2, on the CRT screen (not shown).

Figure 9A:
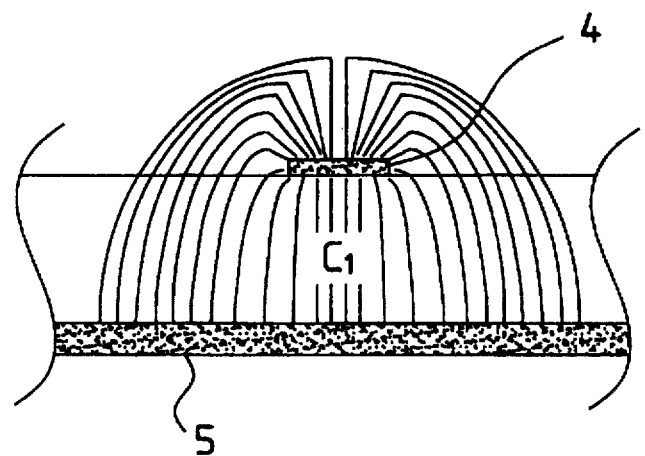
FIGS. 9A and 9B illustrate the operation by the input apparatus for detecting the position of the operator's finger.

An explanation will further be given when the operator's finger 3 is used to perform the input operation through use of coordinates. In this case, the analog switch 10 has been switched to the first contact 10a according to a signal from the switching means contained in the CPU 15 so that the oscillation circuit 11 can be connected to the X-coordinate multiplexer 9. In this state, the CPU 15 actuates the X-coordinate multiplexor 9 and the Y-coordinate multiplexer 17. It also turns on the switch $SW_1$ provided for the X multiplexor 9 and then sequentially turns on the switches $SW_1$ to $SW_n$ provided for the Y multiplexor 17. Thereafter, similarly, the CPU 15 turns on each of the switches $SW_2$ to $SW_n$ provided for the X multiplexer 9 and then sequentially turns on the switches $SW_1$ to $SW_n$ provided for the Y multiplexor 17. Due to this switching operation, oscillating waveforms are input to the respective X electrodes 4 ($X_1$, $X_2$, ..., $X_n$) from the oscillation circuit 11, whereby the voltages are applied to the respective X electrodes 4 and the Y electrodes 5 ($Y_1$, $Y_2$, ..., $Y_n$) placed below the X electrodes 4 through the capacitance $C_1$, as illustrated in FIG. 9A.

Figure 9B:
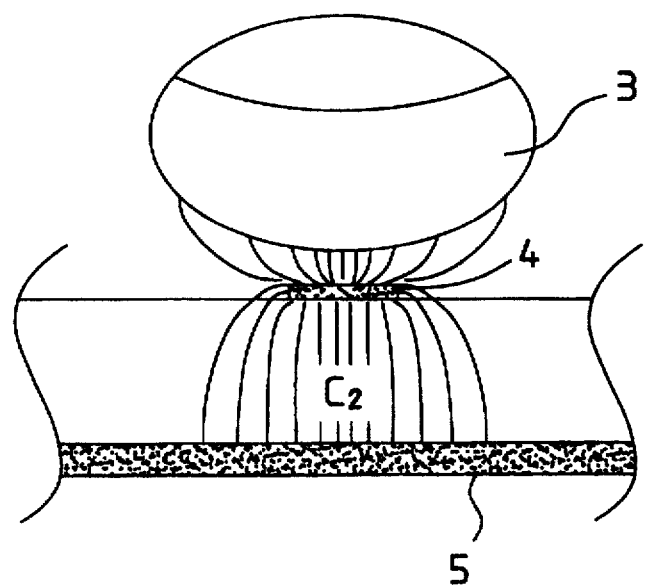

Under these conditions, as shown in FIG. 9B, the operator's finger 3 is pressed against a desired position on the tablet 1 so that lines of electric force are partially drawn into the finger 3. This reduces the capacitance $C_1$ formed between the X and Y electrodes 4 and 5 to the capacitance $C_2$, and based on this change in the capacitance, the voltage is output from each of the Y electrodes 5. In a manner similar to the detection of the coordinate in the Y axis direction designated by the input pen 2 which has been previously discussed, the voltage output from each of the Y electrodes 5 passes through the amplifying circuit 18 and the filter circuit 19, and is digitized in the A/D converter 14. Then, the digitized data is read into the CPU 15. The voltage detection means contained in the CPU 15, based on the data output from the A/D converter 14, determines the Y electrode 5 generating the smallest voltage and the corresponding X electrode 4, thereby detecting the coordinates in the X and Y-axes directions of the point designated by the finger 3. Thereafter, the CPU 15 further transmits this positional information to the host computer 16 and selects the menu corresponding to the position designated by the finger 3 from the menus displayed on the LCD screen.

The above-described analog switch 10 may be automatically switched between the first and second contacts 10a and 10b every predetermined time in the time sharing manner, by way of example, so that the switching can be regularly made in the CPU 15 between the voltage detection means for the input pen 2 and the detection means for the finger 3. If this switching operation of the analog switch 10 is carried out at the speed of a few mms in the time sharing manner and the scanning operation by the X and Y multiplexors 9 and 17 is performed at the speed of a few μs, the data transmission to the host computer 16 can be conducted only by the unit of a few mms. Thus, the switching operation of the analog switch 10 in the time sharing manner does not interfere with the correct detection of the coordinates of a point designated by either the input pen 2 or the finger 3.

Alternatively, the switching operation of the analog switch 10 may be carried out according to the following method. A starting switch (not shown) for rendering the tablet 1 operative may be turned on, thus automatically switching the analog switch 10 to the first contact 10a. Then, the CPU 15, based on the data output from the A/D converter 14, may detect whether the voltage applied to the Y electrodes 5 has been increased or decreased relative to the reference voltage. Namely, the CPU 15 determines that the input pen 2 has pressed against the tablet 1 if the voltage applied to the Y electrodes 5 has been increased relative to the reference voltage, thus performing the detection of the coordinates of a point designated by the pen 2. If there is no change in the voltage after a lapse of a predetermined time, the CPU 15 automatically switches the analog switch 10 to the second contact 10b. Further, the CPU 15 determines that the finger 3 has touched the tablet 1 if the voltage applied to the Y electrodes 5 has been decreased relative to the reference voltage, thus carrying out the detection of the coordinates of a point designated by the finger 3.

This embodiment has been described by way of example only, and the present invention is not restricted thereto. For example, the coordinates of a point designated by the input pen 2 may be detected according to an equation other than the equation (4), based on the voltages output from a plurality of X electrodes 4 and Y electrodes 5.

The construction of the tablet 1 introduced in this embodiment is not exclusive. For example, the X electrodes 4, in place of being formed on the top surface of the glass substrate 6, may be formed on the bottom surface of the protective film 7. Alternatively, all the X and Y electrodes 4 and 5, the protective film 7 and the shield film 8 may be formed by means of printing or a film-forming technique, such as CVD or the like. Further, the switching operation of the analog switch 10 may be performed manually.

Additionally, the oscillation circuit 11 provided for the tablet 1 may be omitted, and the input operation may be carried out only by use of the input pen 2.

As will be clearly understood from the foregoing description, the present invention offers the following advantages.

The positional information of the input pen which is pressed against the tablet can be detected by the following procedure. The voltage is applied to each electrode of the tablet from the oscillating pen through the capacitance, and whereby the coordinates of the point designated by the pen are detected based on the output voltage that varies according to the distance between the pen and each electrode. On the other hand, the positional information of the operator's finger touching the tablet can be detected by the following procedure. The voltage at a predetermined frequency is sequentially applied to one of the X and Y electrodes of the tablet from the pulse generating means. Thus, the voltage applied across the X and Y electrodes through the capacitance is changed due to a decrease in the capacitance caused by the touching of the finger on the tablet. According to this change in the applying voltage, the detection of the coordinates of the point designated by the finger is performed. With this arrangement, the coordinates of a point designated either by the input pen or the operator's finger can be detected with higher precision without being influenced by dirt, moisture and fat content and the like. Also, a cable for the input pen can be omitted, thereby improving the ease of operation.

Moreover, when the switching means is actuated based on the comparison of the voltage that is output from each electrode with the reference voltage, or when the switching means is driven in the time sharing manner so as to be selected every predetermined time, a determination is automatically made whether the input pen or the finger is used as a designating tool. Based on this determination, the coordinates of a point designated either with the input pen or the finger can be detected. The ease of operation can also be improved by this advantage.

Still further, the positional information of the input pen that is pressed against the tablet can be computed with higher precision according to a linear function equation, only by the factors, such as voltages output from the three electrodes and a known pitch between the electrodes, regardless of the distance between the pen and the tablet. It is thus possible to provide a coordinate input apparatus which can be constructed simply with a reduced burden on the CPU, and yet achieves higher precision of the positional detection.

What is claimed is:

1. A coordinate input apparatus comprising:
   a tablet including a plurality of X electrodes and Y electrodes arranged at an equal pitch in the form of a matrix and an insulating layer located between the plurality of X electrodes and the plurality of Y electrodes;
   first coordinate detection means for detecting a position on said tablet designated by an input pen;
   second coordinate detection means for detecting a position on said tablet designated by a finger; and
   change-over means for selecting one of said first and second coordinate detection means,
   wherein said first coordinate detection means has pulse generating means contained in said input pen for generating an oscillating voltage at a predetermined frequency, voltage detection means connected to the tablet for detecting a voltage applied to each of said X and Y electrodes from the oscillating voltage generated by said input pen, and computation means for computing coordinates of the position designated by said input pen based on the voltage detected by said voltage detection means,
   wherein said second coordinate detection means has pulse generating means for applying a voltage at a predetermined frequency to at least one of said X and Y electrodes, voltage means for detecting a change in the voltage across said X and Y electrodes caused by the proximity of the finger, and computation means for computing coordinates of the position designated by the finger based on the voltage detected by said voltage detection means.

2. A coordinate input apparatus according to claim 1, wherein said change-over means includes means for comparing the voltage that is output from each of said X and Y electrodes with a reference voltage, and upon this comparison, means for selecting said first coordinate detection means when the output voltage is increased relative to said reference voltage and for selecting said second coordinate detection means when the output voltage is decreased relative to said reference voltage.

3. A coordinate input apparatus according to claim 1, wherein said change-over means includes switching means that is driven in a time sharing manner and switches after predetermined time periods so as to select between said first and second coordinate detection means in accordance with a switching operation of said switching means.

4. A coordinate input apparatus according to claim 2, wherein said insulating layer of said tablet is formed of a glass substrate, said X and Y electrodes of said tablet are each formed of a transparent material, and said tablet is stacked onto a liquid crystal display with a transparent shield film located there between.

5. A coordinate input apparatus according to claim 3, wherein said insulating layer of said tablet is formed of a glass substrate, said X and Y electrodes of said tablet are each formed of a transparent material, and said tablet is stacked onto a liquid crystal display with a transparent shield film located there between.

6. A coordinate input apparatus comprising:
   a tablet including a plurality of X electrodes and Y electrodes arranged at an equal pitch P in the form of a matrix and an insulating layer located between the plurality of X electrodes and the plurality of Y electrodes;
   an input pen for generating an oscillating voltage at a predetermined frequency;
   voltage detection means for detecting a voltage applied to each of said electrodes by said oscillating voltage based on a change in capacitance between said input pen and each of said X and Y electrodes; and
   computation means for computing the amount of displacement L from said input pen to the a selected one of the X and Y electrodes located in proximity nearest to said pen input in the direction in which said X and Y electrodes are arranged, according to the following equation:

$$L=P(V_1V_2-V_1V_3)/2(V_1V_3+V_1V_2-2V_2V_3)$$

wherein $V_1$ indicates the voltage that is output from the X and Y electrode having the largest applying voltage; $V_2$ and $V_3$ represent the voltages that are output from both the X and Y electrodes adjacent to the X and Y electrode that outputs the largest voltage $V_1$.

7. A coordinate input apparatus according to claim 6, wherein said insulating layer of said tablet is formed of a glass substrate, said X and Y electrodes of said tablet are each formed of a transparent material, and said tablet is stacked onto a liquid crystal display with a transparent shield located there between.

8. A coordinate input apparatus comprising:
   a sensor part in which a plurality of X electrodes and Y electrodes arranged at an equal electrode pitch are formed in a matrix through an insulating layer and said X electrodes are laminated by a protective film;
   an X electrode multiplexer part connected to one end of each of said X electrodes;
   a Y electrode multiplexer part connected to one end of each of said Y electrodes;
   pulse generating means for applying a driving pulse having a predetermined frequency to at least one of said X electrode or Y electrode;
   varying value detecting means connected to said X electrodes or Y electrodes and for detecting varying voltages of said X electrodes and Y electrodes generated by contact of an instruction operating member with said sensor part; and
   control means for controlling said X electrode multiplexer and said Y electrode multiplexer to select a connected X electrode or Y electrode and for calculating a contacted position of said instruction operating part on the basis of a voltage value of each of the X electrodes and Y electrodes detected by said varying value detecting means,
   wherein said control means calculates said position of said operation instructing part by determining three voltage values including a first electrode having the maximum varying voltage and second and third electrodes adjacent to the first electrode, and calculating a peak point of a parabola using said three voltage values and a formula based on said electrode pitch, where said peak point of said parabola indicates said contact point of said instruction operating member.

* * * * *

UNITED STATES PATENT AND TRADEMARK OFFICE
CERTIFICATE OF CORRECTION

PATENT NO. :     5,790,106
DATED      :     August 4, 1998
INVENTOR(S):     Shinji Hirano et al.

It is certified that error appears in the above-indentified patent and that said Letters Patent is hereby corrected as shown below:

On the Title Page after line 4, under "U.S. PATENT DOCUMENTS" add a new line as follows:

--5,455,574    10/1995    Itaya et al.    178/18--.

In the Claims

In Claim 6, line 14, delete "the".

Signed and Sealed this

Eleventh Day of May, 1999

Attest:

Q. TODD DICKINSON

Attesting Officer     Acting Commissioner of Patents and Trademarks